UNITED STATES PATENT OFFICE 2,592,930

METHOD FOR PREPARING VITAMIN B₁ AND ITS ALLIED COMPOUND

Taizo Matsukawa, Suitashi, Osaka, and Takeo Iwatsu, Higashisumiyoshi-ku, Osaka, Japan, assignors to Takeda Yakuhin Kogyo Kabushikigaisha, Higashi-ku, Osaka-shi, Japan No Drawing. Application August 29, 1950, Serial No. 182,141. In Japan March 17, 1950

10 Claims. (Cl. 260—256.6)

This invention relates to a new process of preparing vitamin B₁ and its allied compounds: namely, 2-alkyl-4-amino-5-aminomethylpyrimidine, γ-aceto-γ-halogenopropylalcohol or its esters, or γ,γ-diaceto-γ-halogenopropylalcohol (this compound is generally isolated as its cyclic form, 2-methyl-2-hydroxy-3-acetyl-3-halogenotetrohydrofurane) and carbon disulphide are condensed in the presence of a basic acid-neutralizing agent, and then by making the reaction mixture acid the product is cyclized to thiothiazolone-derivative, which is finally oxidized with an oxidizing agent to vitamin B₁ or its allied compounds.

When as one of the starting materials γ-aceto-γ-halogenopropylalcohol is used, N-(2-alkyl-4-aminopyrimidyl - 5) - methyldithiocarbamate is formed in the first step, but if the ester of the said alcohol is used, the corresponding acyl-derivative is formed, which, however, is readily saponified when the reaction mixture is made acid in the second step. The most suitable ester as starting material is that of acetic acid or benzoic acid. γ-Aceto-γ-halogenopropylalcohol is usually difficult to obtain in pure state as compared with its ester, accordingly its condensation product is not generally so pure. Though as mentioned above γ,γ-diaceto-γ-halogenopropylalcohol is generally isolated as its cyclic form, 2-methyl - 2 - hydroxy - 3 - acetyl - 3 halogenotetrahydrofurane, it can be used as such for the preparation of vitamin B₁ and its allied compounds with the same result as does γ-aceto-γ-halogenopropylalcohol or its ester. In this case the halogen represents chlorine or bromine. This condensation reaction is an exothermic one, therefore need not be heated. To begin with, the pyrimidine-compound, γ - aceto - γ - halogenopropylalcohol or its ester and a basic, acid-neutralizing agent are dissolved in a solvent and then carbon disulphide is added, when the reaction sets in spontaneously. In this case, the use of a solvent which does not take part in the reaction is necessary to control the reaction and to make it proceed smoothly. As solvent ethanol, methanol or these diluted with water are suitable for industrial purposes. As basic, acid-neutralizing agent ammonium carbonate or aqueous ammonia is employed.

The reaction is represented in the following equation:

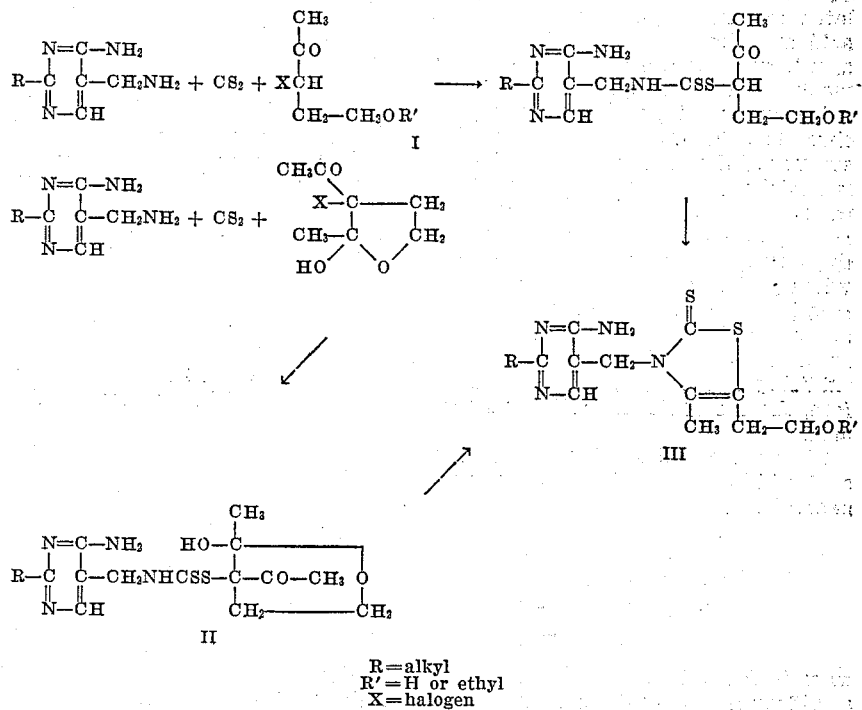

R = alkyl
R' = H or ethyl
X = halogen (II) is difficult to isolate in pure state, but both (I) and (II) can be converted without purification to the thiothiazolone-compound (III) with a mineral acid, when as already mentioned the ester is readily saponified. As mineral acid dilute hydrochloric acid or dilute sulfuric acid is suitable, but nitric acid cannot be used because it acts oxidatively. In general the reaction proceeds at room temperature, but it can be accelerated by heating. The compounds of type (III) are new compounds prepared for the first time by the present inventors, and the compound (R=CH₃, R′=H) is recrystallized from ethanol in colorless needles melting at 238–239°, insoluble in water, soluble in ethanol, methanol and hydrochloric acid. The compound (R=C₂H₅, R′=H)

takes the form of colorless prisms melting at 225°, and the compound (R=C₆H₅CH₂—, R′=H) takes the form of colorless leaflets, melting at 224°.

When the alcoholic solution of these compounds is treated with mercuric carbonate to desulfurize, the corresponding thiachromines are formed, which correspond with authentic samples prepared by the known methods.

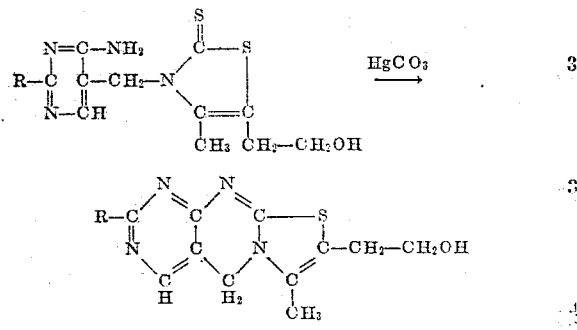

This fact supports the idea that the compounds formed by cyclization are the derivatives of thiothiazolone. The thiothiazolone-compounds formed in the reaction mixture are oxidized as such to thiozolium-compounds, that is, vitamin B₁ or its allied compounds, or they are once isolated to purity and dissolved again in a dilute acid and then oxidized similarly. As oxidizing agent, such as are used generally in an acidic medium are suitable, for example, hydrogen peroxide, nitric acid, potassium per permanganate, chromic acid, etc. In this case such a small amount of the acid as to make the reaction start is sufficient, because sulfuric acid is formed as the reaction proceeds. The reaction proceeds at room temperature, the sulphur attached to the thiazolenucleus being split off as sulfuric acid. When purity of the product, working up after the reaction or intensity of the oxidation, are taken into account, hydrogen peroxide seems to be most suitable as oxidizing agent. An excess of the oxidizing agent causes further oxidation, therefore, the use of its theoretical amount is preferable.

Thus the resulting thiazolium compounds are acid addition products of the compound of the general formula

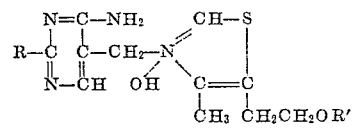

wherein R and R′ have the precedingly-indicated significances, being the sulfate, chloride or their mixture according to the acid used or formed, but all of them can be converted to chloride by the addition of barium chloride to remove sulfuric acid.

Vitamin B₁ or its allied compounds prepared in this manner are generally purer than those prepared by the known methods, therefore, this method is profitable for their manufacture in commercial scale.

EXAMPLES

The examples of the processes for preparing thiothiazolone-compounds and thiazolium-compounds are described separately as follows. The processes of the two groups are combined with each other properly in order to obtain the final products.

*Thiothiazolone-(2) compounds*

1. *N-(2′-methyl-4′-aminopyrimidyl-5′)-methyl -4- methyl - 5 - β - hydroxyethylthiothiazolone (2).—*

(a) A solution of 210 g. of 2-methyl-4-amino-5-aminomethylpyrimidine-hydrochloride in the smallest amount of water is mixed with 160 g. of 50 per cent solution of sodium hydroxide under cooling with water, then 500 cc. of ethanol, 100 cc. of 30% aqueous ammonia and 180 g. of γ-aceto-γ-chloropropyl acetate are added to the mixture, and finally 80 g. of carbon disulphide is dropped in with stirring under cooling with water, when the reaction sets in spontaneously with evolution of heat, and the reaction mixture becomes a crystal paste towards the end of the reaction. The crystals are brought in solution by the addition of 500 cc. of 20 per cent hydrochloric acid, and the solution is boiled for 15 minutes. Then, the ethanol is distilled off under reduced pressure, and the residue is added with 30 per cent solution of sodium hydroxide with stirring until it is strongly alkaline, when a great quantity of crystals separate out. The product is filtered by suction and washed with water until washing is no longer alkaline.

Though the crude product is suitable for the next process, it can be purified by recrystallizing from dilute ethanol in colorless needles, which are insoluble in water, soluble in ethanol and methanol, and melt at 238–239°, and form with hydrochloric acid monohydrochloride melting with decomposition at 243°.

The crystal paste obtained in paragraph (a) above was here separated (α-aceto-γ-acetoxypropyl-(2-methyl-4-aminopyrimidyl-5)-methyl - dithiocarbamate) is filtered by suction, and washed first with ethanol, then with water, and recrystallized from dilute ethanol. The product is soluble in alkali and acid, but insoluble in water, and sinters at about 170° and begins to color towards 210° and melts at 250° with decomposition and blackening. This product also forms with 1 mol. of hydrochloric acid a hydrochloride melting with decomposition at 179°. The hydrochloride is heated to 180°, when it melts with bubbling, and after cooling the fused mass is dissolved in water, decolorized with active charcoal and sodium bicarbonate solution added, when white precipitates separate, which are recrystallized from dilute ethanol in colorless leaflets melting at 172°. This final product is N-(2′-methyl-4′-aminopyrimidyl-5′)-methyl -4- methyl-5-β-acetoxyethylthiothiazolone (2) and its yield is almost theoretical.

γ-Aceto-γ-chloropropyl acetate is prepared in good yield by boiling, under reflux, γ-aceto-γ-chloropropylalcohol (this compound is generally isolated as its anhydride) with three times its weight of glacial acetic acid for 5–6 hours, and fractionating the product under reduced pressure.

(b) A solution of 210 g. of 2-methyl-4-amino-5-aminomethylpyrimidine-hydrochloride in the smallest amount of water is mixed with a solution of 80 g. of sodium hydroxide in 800 cc. of methanol under cooling with water, then 100 cc. of 30 per cent aqueous ammonia and 140 g. of γ-aceto-γ-chloropropylalcohol (as this compound is isolated as its anhydride, it is heated in a boiling water bath with two times its weight of water until the insoluble oil disappears [it requires about 30 minutes], and the aqueous solution is used as such) are added, and finally 80 g. of carbon disulphide is dropped in with stirring, and cooling with water, when the reaction starts under evolution of heat. The product is worked up as in the case of (a).

2. N-(2'-ethyl-4'-aminopyrimidyl-5')-methyl-4-methyl-5-β-hydroxyethylthiothiazolone (2).— A solution of 225 g. of 2-ethyl-4-amino-5-aminomethylpyrimidinehydrochloride in the smallest amount of water is mixed with 160 g. of 50 per cent solution of sodium hydroxide under cooling with water, then 500 cc. of ethanol, a concentrated solution of 60 g. of ammonium carbonate in water and 180 g. γ-aceto-γ-chloropropyl acetate are added to the mixture, and finally 80 g. of carbon disulphide is dropped in, with stirring, when the reaction sets in with bubbling. When the reaction is complete, the reaction mixture is admixed with 500 cc. of 20 per cent hydrochloric acid and boiled for 15 minutes, and after distilling off the ethanol in vacuo, the residue is mixed with 30 per cent solution of sodium hydroxide until it is strongly alkaline, when a large amount of crystals separate out, which is filtered by suction and washed with water until washing is neutral. The product is recrystallized from dilute ethanol in colorless prisms, which are insoluble in water, soluble in ethanol and methanol, and melt at 233°. The crude product also can be used satisfactorily for the next step.

*Thiazolium-compounds*

1. N - (2' - methyl - 4' - aminopyrimidyl-5'-) - methyl - 4 - methyl-5-β-hydroxyethylthiazolium-chloridehydrochloride (vitamin B₁ hydrochloride).—

(a) To a mixture of 296 g. of powdered N-(2'-methyl - 4' - aminopyrimidyl - 5' - ) - methyl-4-methyl-5-β-hydroxyethylthiothiazolone (2), 900 cc. of water and 50 cc. of 30 per cent hydrochloric acid is added dropwise 340 g. of 30 per cent hydrogen peroxide with stirring and cooling with ice water, when the reaction sets in under evolution of heat. Care must be taken lest the temperature should rise too high. The reaction temperature near 40° is generally suitable.

When the reaction is complete, the mixture is heated at 50–60°, and an aqueous solution of barium chloride added until barium sulfate no longer precipitates. The barium sulfate is filtered off, and the filtrate, after decolorizing with active charcoal, concentrated under reduced pressure, and then about 1.5 l. of hot ethanol added and the mixture allowed to stand, when colorless needles or leaflets separate out, which are filtered and washed with ethanol. The product melts at 250°. The yield is 280 g.

(b) To a solution of 10 g. of N-(2'-methyl-4'-aminopyrimidyl - 5') - methyl - 4 - methyl - 5 - β - hydroxyethylthiothiazolone (2) in a mixture of 15 g. of 30 per cent hydrochloric acid and 100 cc. of water is added an aqueous solution of 6.4 g. of potassium permanganate with stirring and cooling with ice water at such a rate that the temperature does not rise. When the reaction is complete, the reaction mixture is evaporated to dryness in vacuo, and to the residue is added 50 cc. of water. After filtering off the insoluble substance, there is added to the filtrate a saturated solution of picric acid in water until the picrate no longer precipitates. The picrate is decomposed with hydrochloric acid, and the liberated picric acid is removed by shaking with ether, and the acidic solution, after concentration in vacuo, is treated with 30 cc. of hot ethanol and allowed to stand, when colorless needles or leaflets separate out, which are filtered and washed with ethanol. The product melts at 250°, and the yield amounts to 8 g.

2. N - (2' - methyl - 4' - aminopyrimidyl - 5') - methyl - 4 - methyl - 5 - β - hydroxyethylthiazolium sulfate (vitamin B₁ sulfate.)—To a mixture of 20 g. of powdered N-(2'-methyl-4'-aminopyrimidyl - 5') - methyl - 4 - methyl - 5 - β - hydroxyethylthiothiazolone (2), 80 cc. of water and 1 g. of sulfuric acid is added dropwise, with stirring and cooling with ice-water, 23 g. of 30 per cent hydrogen peroxide, when the reaction sets in under evolution of heat. Reaction temperature close to 40° is suitable. As the reaction proceeds, the insoluble material goes gradually into solution. After the reaction has been completed, the mixture is heated at 50° and a solution of 3.2 g. of barium hydroxide added, and the resulting barium sulfate is filtered off. The filtrate, after decolorizing with active charcoal, is concentrated under reduced pressure, and then mixed with 120 cc. of hot ethanol. After cooling the separated crystals are filtered and dissolved again in the smallest of water, and the solution is mixed with hot ethanol and allowed to stand, when crystals separate out, which are filtered and washed with ethanol. The yield is 20 g. The product takes the form of colorless needles melting with decomposition at 213°, and judging from the results of the analysis it is a neutral salt containing 1 mol of surfuric acid.

3. N - (2' - ethyl - 4' - aminopyrimidyl - 5') - methyl - 4 - methyl - 5 - β - hydroxyethylthiazoliumchloridehydrochloride.—To a mixture of 31 g. of powdered N-(2'-ethyl-4'-aminopyrimidyl-5') - methyl - 4 - methyl - 5 - β - hydroxyethylthiothiazolone (2), 100 cc. of water and 5 cc. of 35 per cent hydrochloric acid is added dropwise, with stirring and cooling with ice water, 34 g. of 30 per cent hydrogen peroxide, when the reaction starts under evolution of heat. Care is taken to keep the reaction temperature at about 40°. As the reaction proceeds the insoluble substance goes gradually into solution. After the completion of the reaction, the mixture is heated to 50–60°, and, with stirring, an aqueous solution of barium chloride added until barium sulfate no longer precipitates. The barium sulfate is filtered off, and the filtrate, after decolorizing with active charcoal, is concentrated in vacuo, and 150 cc. of hot ethanol added. After cooling the separated crystals are filtered by suction and washed with ethanol.

The product takes the form of colorless needles melting with decomposition at 235°. The yield is 28 g.

What we claim is:

1. A process for preparing the acid addition product of a compound of general formula

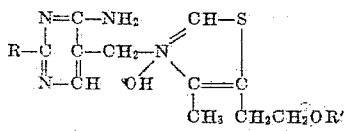

wherein R represents a member selected from the the class consisting of methyl and ethyl radicals, and R' represents a member selected from the class consisting of hydrogen and acyl radical, which comprises reacting a compound of general formula

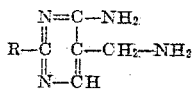

wherein R means a member selected from the group consisting of methyl and ethyl radicals, with one of the compounds of general formulas

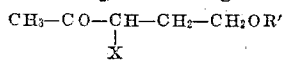

and

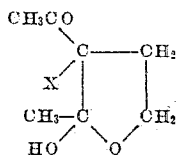

wherein R' represents a member selected from the class consisting of hydrogen and acyl radical, X is a member selected from the class consisting of chlorine and bromine, and carbon disulphide in the presence of a basic, acid-neutralizing agent, and cyclizing the product to the corresponding thiothiazolone-derivative of the formula

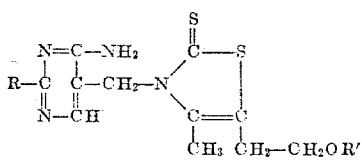

wherein R and R' have the precedingly-indicated significances by the addition of a mineral acid, and oxidizing the last-mentioned product with the theoretical amount of an oxidizing agent which acts in an acidic medium.

2. A process for preparing the acid addition product of N-(2'-methyl-4'-amino-pyrimidyl-5')-methyl-4-methyl-5-β-hydroxyethyl - thiazolium hydroxide which comprises reacting, in a lower aliphatic alcohol, 2-methyl-4-amino-5-aminomethyl-pyrimidine with γ-aceto-γ-halogenopropyl alcohol and carbon disulphide in the presence of a basic, acid-neutralizing agent, and making the reaction mixture acid by the addition of a mineral acid in order to convert the product into the corresponding thiothiazolone-derivative of the formula

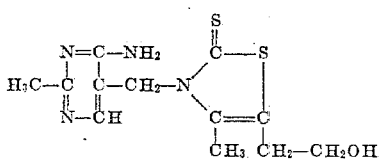

and oxidizing the last-mentioned product with the theoretical amount of an oxidizing agent which acts in an acidic medium.

3. A process for preparing the acid addition product of N-(2'-methyl-4'-amino-pyrimidyl-5')-methyl-4-methyl-5-β-hydroxyethyl - thiazolium hydroxide which comprises reacting, in a lower aliphatic alcohol, 2-methyl-4-amino-5-aminomethyl-pyrimidine with an ester of γ-aceto-γ-halogenopropyl alcohol and carbon disulphide in the presence of a basic, acid neutralizing agent, and making the reaction mixture acid by the addition of a mineral acid in order to convert the product into the corresponding thiothiazolone-derivative of the formula

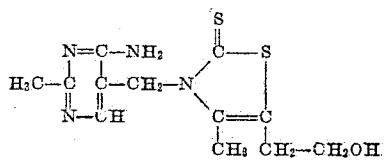

and oxidizing the last-mentioned product with the theoretical amount of an oxidizing agent which acts in an acidic medium.

4. A process for preparing the acid addition product of N-(2'-ethyl-4'-aminopyrimidyl-5')-methyl-4-methyl-5-β-hydroxyethyl - thiazolium hydroxide which comprises reacting, in a lower aliphatic alcohol, 2-ethyl-4-amino-5-aminomethylpyrimidine with γ-aceto-γ-halogeno-propyl alcohol and carbon disulphide in the presence of a basic, acid-neutralizing agent, and making the reaction mixture acid by the addition of a mineral acid in order to convert the product into the corresponding thiothiazolone-derivative of the formula

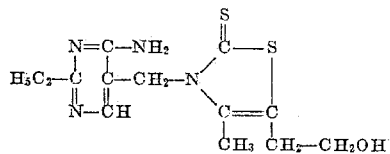

and oxidizing the last-mentioned product with the theoretical amount of an oxidizing agent which acts in an acidic medium.

5. A process of preparing the acid addition product of N-(2'-ethyl-4'-aminopyrimidyl-5')-methyl-4-methyl-5-β-hydroxyethyl - thiazolium hydroxide which comprises reacting, in a lower aliphatic alcohol, 2-ethyl - 4 - amino - 5 - aminomethyl-pyrimidine with an ester of γ-aceto-γ-halogeno-propyl alcohol and carbon disulphide in the presence of a basic, acid-neutralizing agent, and making the reaction mixture acid by the addition of a mineral acid in order to convert the product into the corresponding thiothiazolone-derivative of the formula

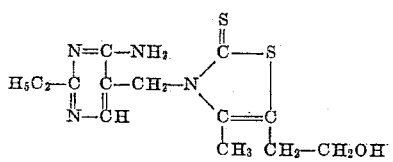

and oxidizing the last-mentioned product with the theoretical amount of an oxidizing agent which acts in an acidic medium.

6. A process for preparing the acid addition product of N-(2'-methyl - 4' - amino-pyrimidyl-5')-methyl-4-methyl - 5 - β - hydroxyethyl - thiazolium hydroxide which comprises reacting, in ethyl alcohol, 2-methyl-4-amino-5-aminomethyl-pyrimidine with γ-aceto-γ-chloropropyl alcohol and carbon disulphide in the presence of ammonia, and cyclizing the product by the addition of hydrochloric acid, and oxidizing the cyclized product with the theoretical amount of hydrogenperoxide in hydrochloric acid acidic medium.

7. A process for preparing the acid addition product of N-(2'-methyl-4'-aminopyrimidyl-5')-methyl-4-methyl-5-β-hydroxyethyl - thiazolium hydroxide which comprises reacting, in ethyl alcohol, 2-methyl-4-amino-5-aminomethyl-pyrimidine with γ-aceto-γ-chloro-propyl acetate and carbondisulphide in the presence of ammonia, and cyclizing the product by the addition of hydrochloric acid, and oxidizing the cyclized product with the theoretical amount of hydrogenperoxide in hydrochloric acid acidic medium.

8. A process for preparing the acid addition product of N-(2'-methyl-4'-amino-pyrimidyl-5') - methyl - 4 - methyl-5-β-hydroxyethyl - thiazolium hydroxide which comprises reacting, in ethylalcohol, 2-methyl-4-amino-5-aminomethyl-pyrimidine with γ-aceto-γ-chloro-propyl-acetate and carbon disulphide in the presence of ammonia, and cyclizing the product by the addition of hydrochloric acid, and oxidizing the cyclized product with the theoretical amount of potassium permanganate in hydrochloric acid acidic medium.

9. A process for preparing the acid addition product of N-(2'-ethyl-4'-aminopyrimidyl-5')-methyl-4-methyl-5-β-hydroxyethyl - thiazolium hydroxide which comprises reacting, in ethyl alcohol, 2-ethyl-4-amino-5-aminomethyl-pyrimidine with γ-aceto-γ-chloro-propyl alcohol and carbon disulphide in the presence of ammonia, and cyclizing the product by the addition of hydrochloric acid, and oxidizing the cyclized product with the theoretical amount of hydrogen peroxide in hydrochloric acid acidic medium.

10. A process for preparing the acid addition product of N-(2'-ethyl-4'-aminopyrimidyl-5')-methyl - 4 - methyl-5-β-hydroxyethyl thiazolium hydroxide which comprises reacting, in ethyl alcohol, 2-ethyl-4-amino-5-aminomethyl-pyrimidine with γ-aceto-γ-chloro-propyl acetate and carbon disulphide in the presence of ammonia, and cyclizing the product by the addition of hydrochloric acid, and oxidizing the cyclized product with the theoretical amount of hydrogenperoxide in hydrochloric acid acidic medium.

TAIZO MATSUKAWA.
TAKEO IWATSU.

No references cited.